United States Patent [19]

Carlson

[11] 4,194,496
[45] Mar. 25, 1980

[54] SOLAR HEAT STORAGE SYSTEMS

[76] Inventor: Norman G. Carlson, 2431 S. Shore Blvd., White Bear Lake, Minn. 55110

[21] Appl. No.: 891,732

[22] Filed: Mar. 30, 1978

[51] Int. Cl.$^2$ ................................................. F24J 3/02
[52] U.S. Cl. ............................... 126/430; 165/104 S; 126/400
[58] Field of Search .................. 126/270, 271, 400; 237/1 A; 165/104 S, DIG. 4, 101, 103

[56] References Cited

U.S. PATENT DOCUMENTS

| | | | |
|---|---|---|---|
| 3,854,530 | 12/1974 | Jouet et al. | 165/163 |
| 3,877,441 | 4/1975 | Mach et al. | 126/400 X |
| 4,021,895 | 5/1977 | Morse et al. | 126/400 |
| 4,088,183 | 5/1978 | Anzai et al. | 165/104 S |
| 4,114,600 | 9/1978 | Newton | 126/400 X |
| 4,124,061 | 11/1978 | Mitchell et al. | 165/104 S |
| 4,137,898 | 2/1979 | Koizumi et al. | 126/270 |

Primary Examiner—James C. Yeung
Assistant Examiner—Larry Jones
Attorney, Agent, or Firm—Jacobson and Johnson

[57] ABSTRACT

A spiral solar heat storage unit having air ducts radially spaced from the center to the rim of the spiral storage unit so the air from the solar collector can be delivered to the various ducts located radially along the spiral storage unit. By delivering the hottest air to the center of the spiral storage unit and the cooler air to the outer portion of the spiral, one provides a radial temperature gradient from the center of the spiral chamber to the rim of the spiral chamber.

7 Claims, 4 Drawing Figures

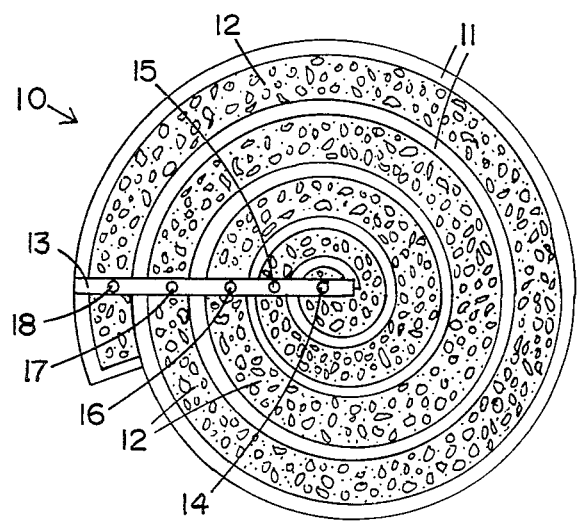
FIG. 1
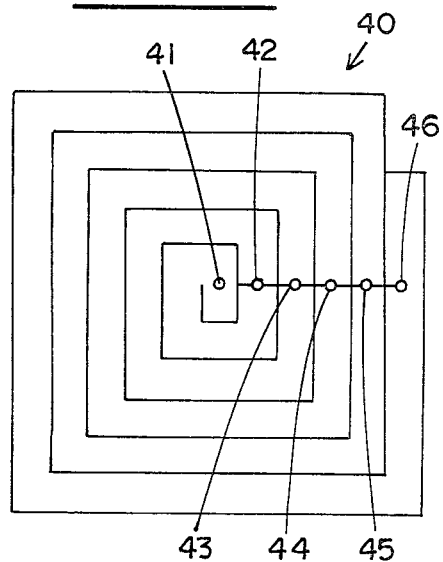
FIG. 4
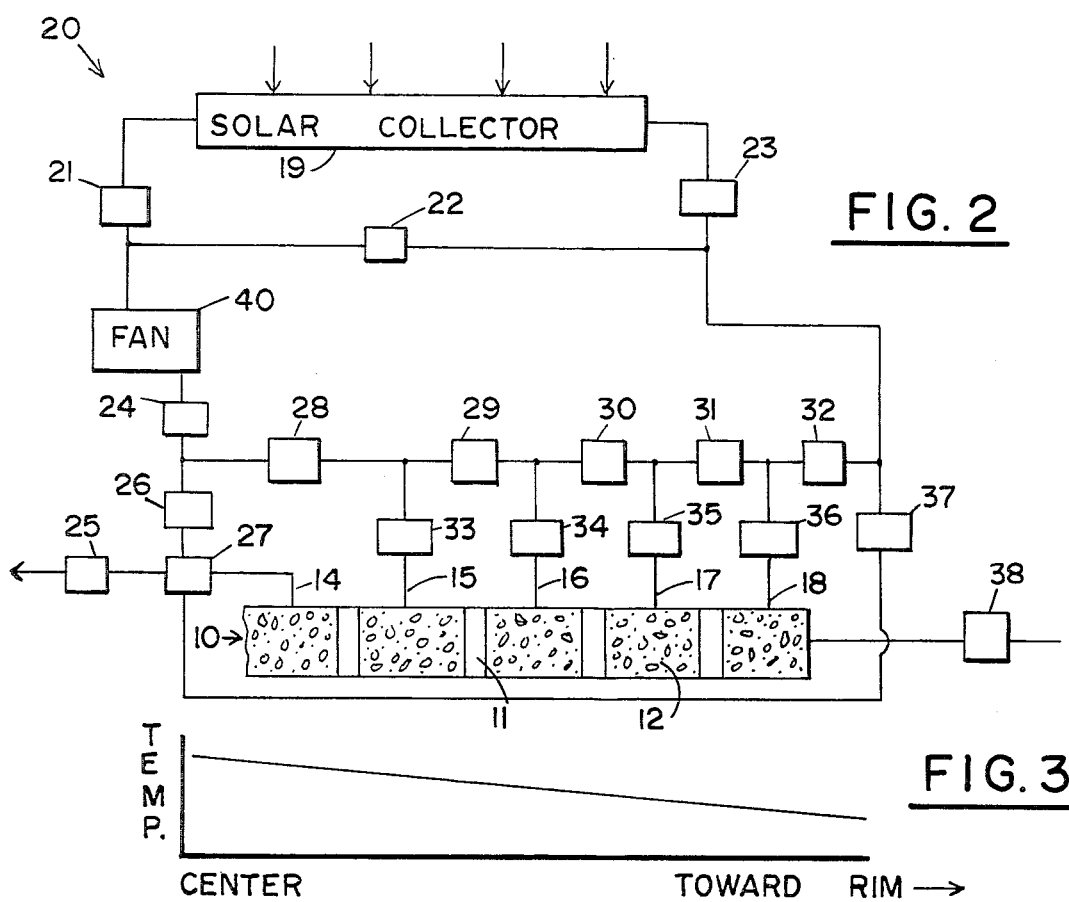
FIG. 2
FIG. 3

SOLAR HEAT STORAGE SYSTEMS

BACKGROUND OF THE INVENTION

1. Field of the Invention

This invention relates generally to solar systems and, more specifically, to solar storage units which can maintain a temperature gradient from the center to the rim of the storage unit.

2. Description of the Prior Art

The concept of solar heat systems is old in the art as evidenced by the Shoemaker U.S. Pat. No. 3,102,532 which shows a solar heat unit disposed in the space of a chamber and comprising a mass of material having openings therein. The openings are readily permeable to the passage of air. The material may be a suitable porous pack of metal wool having surfaces to absorb radiant energy.

The Jouet U.S. Pat. No. 3,854,530 shows a heat exchanger generally of cylindrical shape which provides for the circulation of two fluids, each fluid following four identical spirals.

The Meckler U.S. Pat. No. 3,996,759 shows a stratified thermal mass which stores heated water from solar collectors according to its temperature.

The Gay U.S. Pat. No. 2,584,573 shows method and means for heating a house wherein heat is stored beneath the basement floor and fill of clay or heat conductive earth. The fill contains a labyrinth of pipes through which is circulated a heat transfer liquid.

The present invention differs from the prior art by providing a system for storing solar energy through a spiral chamber having multiple air inlets and outlets.

BRIEF DESCRIPTION OF THE INVENTION

Briefly, the present invention comprises a radial heat storage system having a spiral shape with a plurality of radially spaced air ducts. Temperature control valves are mounted to the air ducts so that the hot air coming from the solar collector goes to the portion of the spiral storage unit which has a temperature less than the incoming air. Heated air can be removed from any portion of the spiral storage unit or through the entire spiral storage unit.

BRIEF DESCRIPTION OF THE DRAWING

FIG. 1 is a top view of my spiral solar collector;

FIG. 2 is a schematic view of a solar system using my spiral storage unit;

FIG. 3 is a graph of spiral storage chamber temperature as a function of radial position; and FIG. 4 is a schematic of an alternate embodiment of my spiral storage unit.

DESCRIPTION OF THE PREFERRED EMBODIMENT

Referring to the drawings, FIG. 1 shows a top view of my spiral solar heat storage unit which is designated by reference numeral 10. Spiral solar storage unit 10 contains a concrete floor (not shown) and a vertical spiraling concrete wall 11. The spiral wall 11 produces a continuous air path from the center of the spiral to the outside of the spiral. Rocks 12 or other suitable heat storage means are located between adjacent spiral walls to provide a porous air path and heat storage. Typically, spiral walls 11 can be made from concrete or they can also be made from other materials such as metal. Located across the top of spiral storage unit 10 is a housing 13 having a first air duct 14, a second air duct 15, a third air duct 16, a fourth air duct 17 and a fifth air duct 18. Each of these ducts provide ingress or egress of air from spiral storage unit 10. To illustrate the single spiral chamber, the top cover of chamber 10 was left out of FIG. 1.

In order to understand the operation of spiral storage unit 10, reference should be made to FIG. 2 which shows a system 20 in schematic view comprising a solar collector 19 connected to spiral storage unit 10. Reference numerals 21 through 38 denote conventional temperature controlled air valves that open or close in response to a predetermined temperature setting. The operation of valves 21 through 38 will be described with respect to the operation of system 20. For clarity only half of spiral storage unit 10 is shown in FIG. 2. The lines shown connecting valves are air ducts for directing air therethrough.

Before proceeding with a description of the operation of spiral storage unit 10, reference should be made to FIG. 3 which shows a temperature gradient graph from the center of storage unit 10 to the rim of storage unit 10. Note, the higher temperature rocks are at the center of the spiral storage unit and the lower temperature rocks are at the rim of the spiral storage unit. This gradient is beneficial because heat loss to the surroundings is minimized and heat sources of different temperatures are available. Also, since the laws of thermodynamics state that heat does not flow uphill, by having a storage unit with a portion of the rocks at a high temperature prompts the extended use of the storage unit under conditions when the average temperature of the stored heat may be less than room temperature. To achieve a radially decreasing temperature, the air supply from collector 19 is directed through air ducts 14 through 18 in accordance with the temperature of the air. The advantage of a spiral storage unit having a radially thermal gradient as shown in FIG. 3 will be more clearly understood during description of the operation of the system shown in FIG. 2.

Referring to FIG. 2, the operation of the solar system 20 will be described under various conditions. Under the first condition, it will be assumed that the heat available from collector 19 is sufficient to heat the building with an excess for storage, i.e., $T_c$ (temperature of air discharging from collector) is greater than $T_r$ (temperature of the room). In this condition fan 40 sucks air from solar connector through valve 21. A temperature controlled valve 24 allows air through valve 24, valve 26, valve 27 and valve 25. Valve 27 is a three-way valve operable for simultaneously directing air into valve 25 and valve 27. A thermostat (not shown) controls valve 27 to allow any excess hot air to flow into duct opening 14 where the heat is dissipated in rocks 12. The hot air from valve 25 heats the building while the hot air flowing through valve 27 and into duct 14 loses heat to the rocks as the air flows through spiral unit 10 and discharges through valve 38. Valve 38 may be connected to solar collector 19 or vented to the outside. As air flows through duct 14, each of valves 33-36 remain closed to allow air to flow along spiral storage unit 10. The hot air directed through valve 27 and into air duct 14 spirals through the spiral solar storage unit until it emerges at a lower temperature at valve 38. As the air flows through spiral 10 the rocks adjacent duct 14 receive heat from the hot air with the rocks at the rim receiving heat from the cooler air.

In a second condition, it will be assumed that solar heat is available from connector 19, i.e., solar collector air temperature $T_c$ is greater than $T_r$ but the amount of heat in the solar collector air is insufficient to heat the building. In this condition fan 40 forces heated air from solar collector 19 through the valve 24. However, because the air temperature is not sufficiently high, valve 26 closes and valves 28 and 29 open. (It will be assumed that the temperature of the air from the solar collector $T_c$ is slightly greater than the temperature of rocks in spiral storage unit 10 at air duct 16.) Valve 30 remains closed but valve 34 is open to allow air flow into solar storage unit 10 through duct 16. The air from solar connector 19 receives heat from rocks 12 as it spirals to the center of unit 10 and flows out duct 14 through valve 27 and valve 25 to heat the room. By forcing air through only a portion of solar storage unit 10, the heat transfer to the air is minimized.

If the air from solar connector 19 $T_c$ were not at sufficient temperature to add heat to the storage unit, the flow of air through collector 19 would be shunted through valve 22. In this case, only the stored heat from the stones and rocks would be available for heating the building. However, if the air from solar connector 19 is above the temperature of any portion of the spiral connector, heat can be added to the spiral storage unit through the valves.

Referring to FIG. 4, an alternate embodiment of the spiral solar connector is shown having a rectangular shape with the walls of the spiral narrowed at each intermediate valve point by stub walls at right angles to the spiral wall. Between the stub walls are inserted valves 41-46 having a perforated pipe with a steel panel extending between the stub walls. This panel is fitted with opening closed by tilting or sliding vanes. With the vanes closed, the spiral is cut off and with the vanes open the spiral is open. The duct work may be located on top of the spiral storage unit or recessed into the storage unit to provide a storage unit of continuous height to provide flexibility so only a portion of the spiral storage unit may be used.

The above are only typical of the multiple uses of my spiral solar storage unit. In addition, by reversing the normal air flow at night the system can be used as a storage for "coolness." In reverse flow, the air moves from left to right through the collector being cooled by conduction to the cool night air and/or by radiation into space. This reverse flow air enters the heat storage unit 10 at a point where the rocks are nearest the air temperature, for example, through valve 35. Part of the air discharges from the storage unit 10 at a point where the rocks are near room temperature, for example through valve 33, and returns to the left end of solar collector 19. The air discharging from solar storage unit 10 has been warmed to room temperature by the rocks but the rocks have thereby been cooled by giving up heat to the air thus storing "coolness". A sufficient volume of air is allowed to flow to the left from valve 35 through the warm rocks exiting through valves 27 and 25 to warm the building. Thus, the building is kept warm at night and "coolness" is stored for use during the day.

The building can be cooled during the day by closing off valves 21 and 23 and opening valve 22 thus bypassing the solar collector. The fan is used to inject room air into the rock where the rock temperature is equal or less than room temperature, for example, through valve 35. This air flows to the right being cooled by the rocks. The cooled air exits through valves 25 and 27.

It should be understood that the exact design of the spiral wall depends upon various factors such as the general climate where the building is located, the number of floors in the building, insulation in the building and pressure drop permissible in the spirals.

According to design requirements, the number of spirals may vary from one to 20 or more. The design requirements will influence the depth of the spirals and the ratio of width to depth and may vary from the center to the outside of the spiral. Typically, this ratio may vary over a range of 5 to 0.1.

The spiral storage unit may occupy an area comprising a very small proportion of the floor area of the building (very low heat or cooling load) or it may occupy an area equal to or even larger than the floor area of the building. In general, the total area of the spiral storage unit usually does not exceed the floor area of the building.

I claim:

1. The method of storing solar heat including:
   forming a solar storage unit having a spiral passage containing heat storage means located in the spiral passage;
   forming air ducts at radially spaced distances along said spiral passage and supplying heated air through at least one of said air ducts to said heat storage means removing the air through another of said air ducts in said spiral passage.

2. A solar storage unit comprising:
   a top member, and a bottom member having a central portion and an outer portion;
   a wall connecting said top member to said bottom member, said wall having one end located in the central portion between said top member and said bottom member, said wall spiraling outward to thereby produce a spiral passage from said central portion to said outer portion, heat storage means located in said spiral passage;
   a set of air ducts radially spaced from the central portion of said solar storage unit to said outer portion of said storage unit to thereby provide air passages to said spiral chamber intermediate the central portion and the outer portion of said solar storage unit.

3. The invention of claim 2 wherein said solar storage unit is connected for air flow with a solar collector.

4. The invention of claim 3 including temperature controlled valves for directing air from the solar connector through said solar storage unit.

5. The invention of claim 4 wherein said spiral walls are arcuate.

6. The invention of claim 4 wherein said spiral walls are comprised of straight sections.

7. The invention of claim 5 wherein said solar storage unit includes rocks for storing heat.

* * * * *

UNITED STATES PATENT OFFICE
CERTIFICATE OF CORRECTION

Patent No. 4,194,496                Dated March 25, 1980

Inventor(s) Norman G. Carlson

It is certified that error appears in the above-identified patent and that said Letters Patent are hereby corrected as shown below:

Claim 1, line 34, after "means" insert --and--

Signed and Sealed this

Seventeenth Day of June 1980

[SEAL]

Attest:

SIDNEY A. DIAMOND

*Attesting Officer*    *Commissioner of Patents and Trademarks*